(12) United States Patent
Maccagnan et al.

(10) Patent No.: US 7,323,133 B2
(45) Date of Patent: Jan. 29, 2008

(54) METHOD FOR PRODUCING MICROMANUFACTURED ITEMS IN CERAMIC MATERIALS

(75) Inventors: Giorgio Maccagnan, Castronno (IT); Paolo Colombo, Padua (IT)

(73) Assignee: Gimac DI Maccagnan Giorgio, Castronno (IT)

( * ) Notice: Subject to any disclaimer, the term of this patent is extended or adjusted under 35 U.S.C. 154(b) by 659 days.

(21) Appl. No.: 10/485,067

(22) PCT Filed: May 13, 2002

(86) PCT No.: PCT/IT02/00312

§ 371 (c)(1),
(2), (4) Date: Jan. 27, 2004

(87) PCT Pub. No.: WO03/011791

PCT Pub. Date: Feb. 13, 2003

(65) Prior Publication Data

US 2004/0195733 A1 Oct. 7, 2004

(30) Foreign Application Priority Data

Jul. 30, 2001 (IT) .......................... MI2001A1652

(51) Int. Cl.
*B29C 47/00* (2006.01)
*C04B 33/00* (2006.01)

(52) U.S. Cl. ...................... 264/610; 264/629; 264/632; 264/638; 264/177.14

(58) Field of Classification Search ................ 264/610, 264/629, 638, 632, 176.1, 177.14
See application file for complete search history.

(56) References Cited

U.S. PATENT DOCUMENTS

| 3,505,158 | A | * | 4/1970 | Murray ........................ 428/137 |
| 4,133,689 | A | * | 1/1979 | Stroke ........................... 501/88 |
| 4,900,491 | A | * | 2/1990 | Odink et al. ................. 264/219 |
| 5,098,571 | A | * | 3/1992 | Maebashi ............... 210/500.23 |
| 5,114,641 | A | * | 5/1992 | Yamamoto et al. ........ 29/527.1 |
| 5,252,288 | A | * | 10/1993 | Yamamoto et al. ........... 419/28 |
| 5,269,988 | A | * | 12/1993 | Coetzer ....................... 264/614 |
| 5,698,485 | A |   | 12/1997 | Bruck et al. |
| 6,573,020 | B1 | * | 6/2003 | Hanemann et al. ......... 430/198 |
| 7,083,757 | B2 | * | 8/2006 | Billiet et al. ................. 264/610 |
| 2002/0076575 | A1 | * | 6/2002 | Yang et al. .................. 428/689 |
| 2004/0238999 | A1 | * | 12/2004 | Mulligan et al. ........... 264/241 |
| 2005/0077657 | A1 | * | 4/2005 | Ahmad et al. .............. 264/629 |

FOREIGN PATENT DOCUMENTS

| DE | 198 15 978 A | 10/1999 |
| EP | 0 624 558 A | 11/1994 |
| EP | 0 733 455 A | 9/1996 |
| WO | 9953379 A1 | 10/1999 |

* cited by examiner

*Primary Examiner*—Carlos Lopez
(74) *Attorney, Agent, or Firm*—Pearne & Gordon LLP

(57) ABSTRACT

A method for producing ceramic micromanufactured items comprises the following stages: a starting material constituting at least a micromanufactured item (1) is prepared and used to from the micromanufactured item (1); said starting material includes at least a pre-ceramic polymer, and the method further comprises a stage in which the inner structure of the starting material is modified, said structure being turned from a polymeric structure to a ceramic structure after the forming stage of said micromanufactured item (1).

15 Claims, 2 Drawing Sheets

METHOD FOR PRODUCING MICROMANUFACTURED ITEMS IN CERAMIC MATERIALS

This application claims the benefit of International Application Number PCT/IT02/00312, which was published in English on Feb. 13, 2003.

The present invention relates to a method for producing micromanufactured items, preferably made of ceramic materials, and more particularly microtubes; moreover, the present invention relates to micromanufactured items, and in particular to ceramic microtubes, produced with said method.

As is generally known, the recent introduction of micromanufactured items has paved the way for huge technological improvements in many production areas. Within the family of micromanufactured items a main role is played by the so-called microtubes, which consist—as suggested by their name—of tubular structures with extremely small size (typically tubes with characteristic size in the range of microns).

Microtubes can be used in several fields, such as for instance in micro-electromechanical systems, in medical technology, in bioengineering and in micro-fluid dynamics; moreover, according to size requirements and to the chemical/physical properties requested, the microtubes can be made of different materials. For instance, microtubes made of ceramic materials are used in many technological fields, for examples in chromatographic applications (where quartz microtubes—$SiO_2$—with inner diameter below 10 microns are used).

Today, microtubes are produced with conventional methods adapted to the specific cases, and more particularly by extrusion, drawing or pultrusion. Obviously, in such cases production systems have a suitable size.

Such production methods, or better the known production techniques adapted to microscopic scales, nevertheless have several disadvantages, especially related to obtaining micromanufactured items with extremely small size.

As a matter of fact, the reduction of the size of forming instruments leads to huge problems related to maintaining the structural integrity of the manufactured item, which collapses because of its own weight; in addition, while size gets smaller the inner tensions arising within the micromanufactured items (for instance when getting out of the extrusion head, when the material the manufactured item is made of is subject to strong heat discontinuities) can induce irreversible deformations. In case particularly complex structures, or anyway characterized by strong asymmetries as far as material distribution is concerned, should be obtained, this problem arises more frequently and results in the practical impossibility to produce micromanufactured items having the designed characteristics.

Moreover, the reduction of the size of forming instruments cannot often ensure a suitable manufacturing precision or a sufficient finishing level of the surfaces of the micromanufactured items; this disadvantage is particularly serious in case of microtubes, whose inner cavities with extremely small size can be practically unusable because of inaccuracies or unwanted section variations.

It should also be noted that such production methods can be much affected by the disadvantages discussed above in case micromanufactured items made of ceramic materials should be produced. Indeed, the peculiarities of this family of materials (especially from the point of view of fluid dynamics and rheology) badly suit to microextrusion systems, with negative consequences on production efficiency and on product quality. In practice, this results in strong limitations to the minimum size obtainable for manufactured items made of ceramic material (whereas technological requirements often push towards the production of extremely miniaturized ceramic microtubes).

In order to solve such disadvantages at least partly, other production methods have been adopted, which quite differ from traditional operations commonly used on macroscopic scale.

For instance, it is known about a method for producing microtubes in which a microscopic thread-like element is covered with a suitable material (so as to coat said element and thus obtain a semi-finished product consisting of an inner core and of an outer coating associated with the core). The microscopic thread-like element is then eliminated so as to obtain a microtube, which consists in practice of the coating made with the material previously deposited onto said thread-like element (in other words, the inner cavity of the microtube is practically obtained by removing the microscopic thread-like element from the outer coating of the semi-finished product).

Also such known technique is not without problems, which are in this case a not negligible difficulty in controlling accurately the deposit of the material the micromanufactured item will be made of onto the microscopic thread-like element.

This leads to huge problems related to maintaining a pre-determined quality level of micromanufactured items, both from the point of view of the outer surface finishing and from the point of view of the regularity and of the geometrical properties of the inner cavity (in case microtubes should be produced).

Moreover, known deposition processes, including for instance electrodeposition, micro-spraying or similar operations, are quite expensive and little suitable to production requirements on a large scale. In addition, the execution of said processes often requires extremely complex machines which not only call for the presence of specialized personnel, but are also quite expensive as far as reliability and maintenance are concerned.

In this situation the technical task underlying the present invention is to conceive a method for producing micromanufactured items (in particular made of ceramic material), and micromanufactured items produced with said method, which can substantially obviate to the limitations named above.

A main object of the present invention is to conceive a production method allowing to keep a high quality level in terms of geometry, of structural efficiency and of surface finishing and roughness characteristics of the micromanufactured items.

Moreover, the present invention aims at conceiving a method giving optimal results whatever the type of material used to obtain the micromanufactured items (though with particular reference to micromanufactured items in ceramic material).

Within said technical task an important object of the invention is to conceive a method allowing to produce micromanufactured items with extremely reduced size, and more particularly micromanufactured items whose size is smaller than that obtainable with traditional methods.

Moreover, object of the present invention is to conceive a method which can be carried out with relatively simple and reliable machines; meanwhile, an object of the present invention is to conceive a method allowing to follow the methods which can be applied to product with macroscopic size (though without problems related to application and/or lower limits in the sizing of the manufactured items).

Another important object of the invention is to conceive a method which can ensure high production rates with low management and production costs.

The technical task and the objects specified above are substantially achieved by means of a method for producing micromanufactured items, in particular micromanufactured items in ceramic material, having the characteristics specified in one or more of the attached claims.

The following is, as a mere non-limiting example the description of a preferred, though not exclusive, embodiment, of a method for producing micromanufactured items, in particular micromanufactured items in ceramic materials, according to the invention, shown in the attached drawings, in which.

Figure 1:
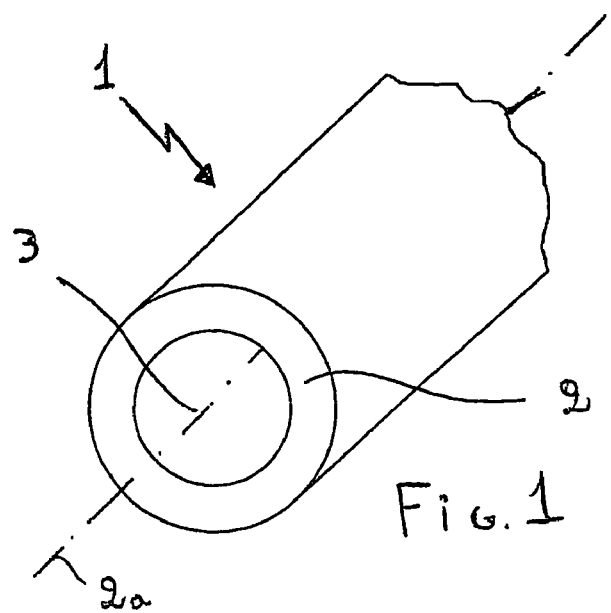
FIG. 1 shows a perspective view of a micromanufactured item which can be produced with the method according to the present invention.
Figure 2:
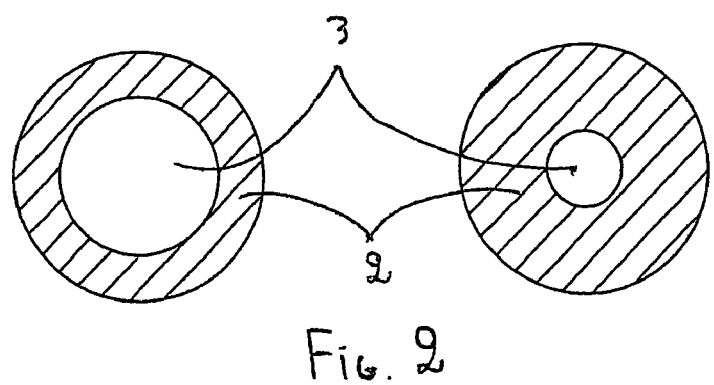
FIGS. 2, 3 and 4 show cross section views of execution variants of the micromanufactured item of FIG. 1.
Figure 3:
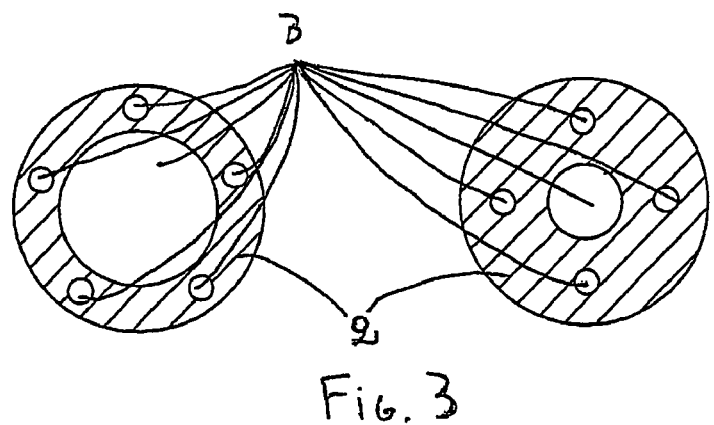

With reference to the figures mentioned, a micromanufactured item produced with the method according to the invention is generally indicated with numeral 1.

The method according to the present invention is substantially based on a preparatory stage consisting in providing a predetermined amount of starting material which will constitute at least a micromanufactured item 1. Such starting material will be suitably formed during a forming stage of the micromanufactured item 1.

Advantageously, the present method provides that the starting material comprises at least a pre-ceramic polymer; the obtainment of the micromanufactured item (which can in this case take on the chemical/physical properties of a ceramic material) is thus greatly simplified thanks to the fact that until the forming stage a polymeric material should be worked and only after completing the forming stage it is possible to give the manufactured items the desired inner structure.

According to current needs a specific pre-ceramic polymer or a mixture of two or more pre-ceramic polymers can be used: for instance, in a particularly appreciable application form of the present invention silicon resin "SR350" of General Electric can be used.

Suitably, in order to ensure an easy workability and a fast forming, the starting material is reduced to a fluid phase, for instance by heating at 75-90° C. in air or by mixing in ethyl alcohol; before starting actual forming said starting material can possibly be added with a pre-determined amount of catalyst, so as to help the development of given chemical reaction (for instance, together with said resin SR350, up to 4% by weight of aminopropyl-triethoxysilane can be used).

Analyzing in further detail the forming stage of the micromanufactured item 1, it should be observed that said stage can advantageously be carried out by extrusion.

It should now be noted that the forming of the micromanufactured item 1 by extrusion is not only made possible but it is also greatly helped by the intrinsic nature of the pre-ceramic polymer (which behaves like any plastic material until its molecular structure is not specifically handled) and by its aggregation state (at least immediately before extrusion).

In the framework of the present invention it is thus evident that if a ceramic micromanufactured item should be produced, a material having in practice chemical/physical and Theological properties which are typical of polymeric materials (and is therefore easily worked with known systems, such as for instance microextruders) is first given a pre-determined shape, and only later the inner structure of said material, to which a desired shape has been given, is modified.

Thanks to the characteristics discussed above, it can also be noted that the present invention can provide for the use of other working methods in order to carry out the forming stage of the micromanufactured item 1; for instance, according to current needs, pultrusion or even injection molding can be advantageously used.

According to a particularly interesting feature of the present invention it is possible to handle the starting material (which is charged into a microextruder or anyway into a forming device) so as to optimize its Theological and/or fluid-dynamic parameters.

More particularly, it is possible to induce a partial reticulation of the polymer. This handling possibility is useful when the viscosity of the polymer the starting material is made of is not suitable for the extrusion process; indeed, the formation of particular chemical bonds acting in the reticulation phenomena thus results in an increase of the viscosity of the pre-ceramic polymer in its fluid phase (which nevertheless, in this working stage, cannot have taken on any characteristics belonging to a ceramic material).

According to current needs said partial reticulation can even be pushed up to such a level so as to turn the starting material into its granular phase, or more precisely in form of powders (which can advantageously be softened again during the forming stage).

As an alternative or in coordination with what has been describe above, it is possible to induce a reticulation within the starting material after the forming stage of the micromanufactured item 1. In this case the reticulation can advantageously be complete (i.e. include the whole of the starting material and/or completed from the chemical point of view). The induction of "complete" reticulation within the starting material can advantageously be used to make the letter unmeltable (for reasons which will be explained in further detail later).

To sum up, it should now be pointed out that the method according to the present invention can advantageously include a stage of induction of reticulation within the starting material; such induced reticulation can be partial or complete and take place in different moments with respect to the forming stage, according to the characteristics which have to be given to said starting material.

Such operating stage can suitably be carried out by heating the micromanufactured item 1 and/or by means of chemical reactions with one or more reticulation-promoting substances. Advantageously, the present invention comprises a stage in which the inner structure of the starting material is modified (as far as its chemical bonds are concerned); more particularly, by carrying out this operating stage such inner structure is turned from the polymeric type (which is practically the inner structure kept by the starting material at least during the forming stage of the micromanufactured item 1) to the ceramic type (i.e. the inner structure on a molecular level which the finished micromanufactured item 1 should have after the forming stage).

Such change in the inner structure can be achieved in different ways according to the idea underlying the present invention and to the different types of pre-ceramic polymers which can be used. For instance, such stage of modification of the inner structure of the starting material can be carried out with a pre-defined heat treatment and/or by means of chemical reactions with given reagents; a further possibility is to irradiate the micromanufactured item 1 with a given radiation (for instance consisting of infrared rays or other).

By way of example, the present method can provide that the micromanufactured item 1 after the forming stage (and possibly after undergoing a complete reticulation, so as to be unmeltable) undergoes a pyrolysis in a conventional oven; such heat treatment can take place in a controlled atmosphere (for instance in nitrogen atmosphere or more generally inert gas atmosphere) and can comprise a heating at a rate of 2° C./min up to a temperature of 1.200° C. Such temperature is kept for 2 hours, then the micromanufactured item 1 is cooled up to room temperature keeping a temperature gradient of 5° C./min.

In the framework of the present invention, thanks to the special equipment which can be used it is possible to produce in particular microtubes which can suitably be made of ceramic material. Obviously, according to current needs microtubes can be lent a great variety of outer shapes and/or inner geometries: for instance it is possible to produce microtubes with one or more inner openings, or microtubes with elliptic, polygonal, multilobed, star-shaped etc. section, according to the requests. Moreover, it is also possible to produce microtubes with curbed axis or winding in the shape of a helix (as further detailed later).

In a particularly appreciable embodiment of the present invention another operating stage can be advantageously provided for: such stage substantially consists in providing a pre-determined amount of secondary material which is associated with the starting material, preferably during the forming stage of the micromanufactured item 1.

Figure 5:
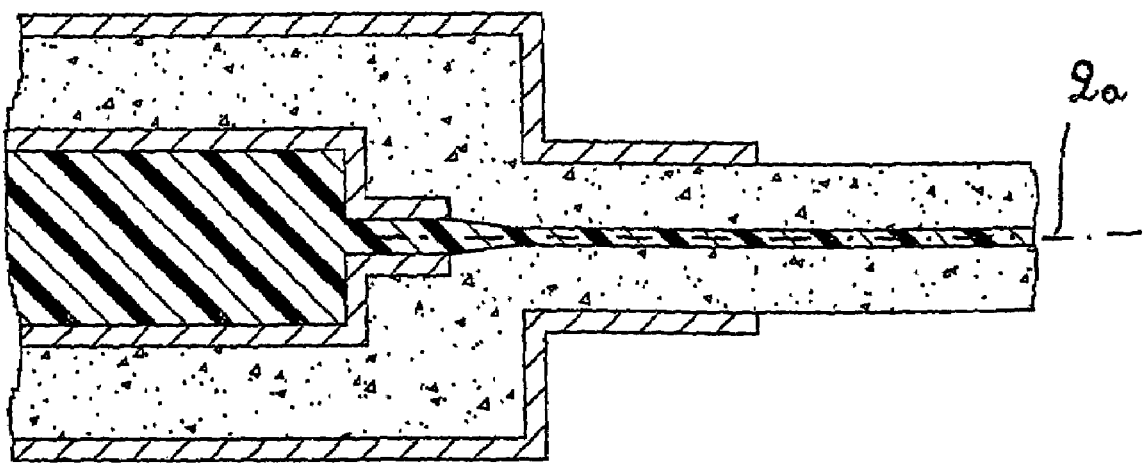
FIG. 5 shows a schematic view of a device which can be used in the method according to the present invention.

More particularly, the association of the secondary material with the starting material can be obtained by co-extrusion of the micromanufactured item 1 (see FIG. 5).

Figure 4:
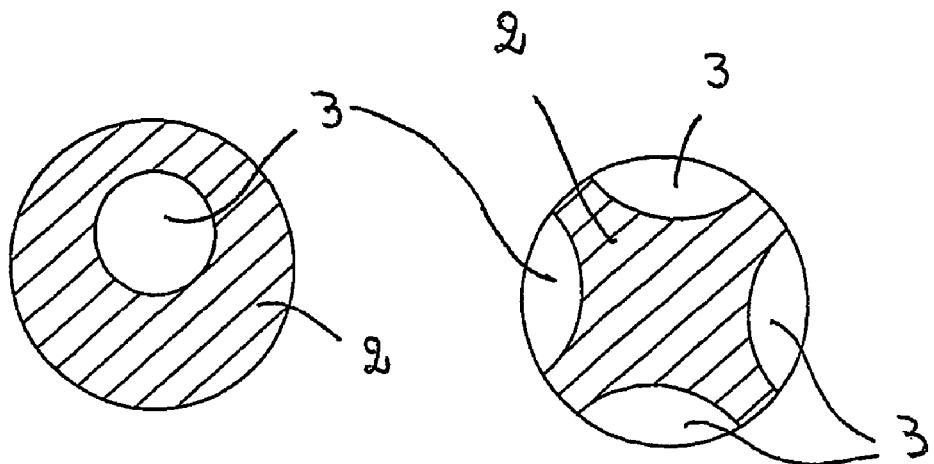

According to current needs said secondary material can be placed within the starting material (during co-extrusion); in any case it is possible to locate the secondary material in various positions, for instance as shown in attached FIG. 4 (where one of the sections shows 4 lobed cavities filled by the secondary material during co-extrusion and then defined by dissociation of said secondary material; it should be noted that said cavities substantially appear on the lateral surface of the micromanufactured item 1).

More generally, it is possible to choose any geometry for the micromanufactured item (or more precisely, any reciprocal arrangement for the starting and secondary material), so as to define the geometries which suit best the various technological requirements.

By operating as described above it is advantageously possible to define a micromanufactured item 1 consisting in practice of two half-portions which are made in their turn of different materials and therefore have different characteristics.

It should now be pointed out that by associating the secondary material with the starting material it is possible, in the framework of the present invention, to carry out further operations on the micromanufactured items 1 which can result in products with new and original characteristics.

For instance, it is possible to produce microtubes starting from micromanufactured items comprising a central core made of secondary material and an outer shell made of starting material; in this case the present methods provides that the secondary material, after being associated with the starting material in a suitable way, is removed from the latter so as to leave a free space within the micromanufactured item 1 (which is going to be the inner cavity of the actual microtube).

Suitably, in order to carry out the operating stages already described above (and therefore define an inner ceramic structure within the starting material) the secondary material should be different from the starting material, at least from the chemical point of view. For instance, the secondary material can comprise at least a thermoplastic polymer (which can be PV, PU, PE, PP, PC, PA, PMMA, PSU, PBT, LCP, PLG, PEEK, FEP, ETFE, PVDF or also a mixture of several among these compounds) and/or at least a thermosetting polymer and/or glycerols and/or cellulose pulp.

In the above-mentioned cases the secondary material practically does not have a defined form before being associated (for instance by co-extrusion) with the starting material; moreover, said secondary material can consist of one or more suitably preformed elongated elements, which can advantageously be made of fibers (broken or continuous, or more generally with pre-determined length) of polymeric material and/or aramide fibers and/or glass fibers and/or carbon fibers.

As already mentioned above, after associating the secondary material with the starting material, said secondary material can be dissociated from the starting material; the secondary material, acting in practice as a disposable material (or in other words, as a non-returnable material), is thus removed from the micromanufactured item 1 and creates empty spaces within the latter.

Such dissociation stage suitably follows the forming stage of the micromanufactured item 1 (whereas the association of the two materials takes place during the forming stage).

Advantageously, said dissociation stage can be carried out simultaneously or after the stage of induction of reticulation within the starting material; nevertheless, dissociation can also be simultaneous to or follow also the stage of modification of the inner structure of the starting material.

From a practical point of view the dissociation of the secondary material can take place by using the same mechanisms related to energy transport (and/or chemical mechanisms) occurring in reticulation and/or in the change of inner structure within the starting material, thus gathering in one operating stage two separate operations. In other words, the heat treatments and/or the chemical reactions occurring during the stage of induction of reticulation in the starting material and/or during the stage of change of inner structure within the starting material, can be used to melt (or more generally fluidize) or even decompose the secondary material and enable its removal. In order to carry out such operating sequence it is possible to use as secondary material thermoplastic polymers softening at a temperature between 60° C. and 200° C. (for instance substances such as polyethylene or polypropylene).

As an alternative it is possible to use a thermosetting polymer volatilizing by heating above 400° C. by means of decomposition (such as for instance a polyurethane). By using the secondary materials mentioned above the micromanufactured item 1 can suitably undergo the same chemical treatment as previously described, or according to current needs and/or to operating conditions (choice of materials, requirements related to finishing and to the absence of impurities within the inner cavities of the micromanufactured item 1 )the parameters related to heat treatment can be modified in any way (for instance by reducing heating speed and/or keeping the micromanufactured item 1 form some hours in a temperature range between 200° C. and 500° C., so as to help fluidization and/or decomposition of the disposable secondary material, which is thus efficiently removed from the starting material).

Also in case co-extruded fibers are used together with the starting material, the same principles used for the dissociation stage can be applied: in these cases, due to the fiber size, the present method allows to obtain extremely small inner cavities (diameters-below 10 microns) with highly regular surfaces. Said fibers can be rapidly and effectively removed during pyrolysis of the micromanufactured item, which occurs during the reticulation of the starting material (or which causes the change of its inner structure).

In few words, thanks to the introduction and to the following removal of the secondary material, it is possible to carry out a stage in which at least an inner cavity is obtained within the micromanufactured item 1; such operating stage is preferably carried out, in a particularly appreciable embodiment of the present invention, simultaneously to the stage of dissociation of the secondary material from the primary material.

It should also be pointed out that the present invention, thanks to the introduction (and to the following removal) of the secondary material, is particularly suitable for the production of microtubes, even in case the latter have complex geometries. As a matter of fact, the presence of the secondary material, acting as a "support element" for the inner cavities which have to be carried out within the microtube (which can now be a ceramic microtube), advantageously allows to obtain structures including several coaxial cavities or even eccentric cavities with respect to the axis of the microtube. It should be pointed out that should the secondary material be absent, the differential tensions developing within the primary material (during reticulation and/or during the change of its inner structure) would be such as to deform the microtube irreversibly and uncontrollably.

In order to vary the characteristics of the micromanufactured item, the present method can also provide for a stage in which the starting material (and/or the secondary material, according to current needs) is added with a given amount of catalysts and/or inert fillers and/or reactive fillers and/or short fibers and/or whiskers and/or nanotubes. Such additions can be made at any moment of the process, and allow in practice to vary several mechanical, physical and chemical properties of the micromanufactured item 1: for instance, by suitably modifying the heat treatment and adding, if necessary, ceramic, metallic or polymeric powders, it is possible to vary the density of the starting material in the ceramic state; such variation of density results in a variation of porosity, which can be determined according to the end uses of the micromanufactured item 1. Another particularly appreciable example of application according to what has been described above consists in the fact that it is possible to produce an electroconductive microtube; this can be obtained by introducing suitable powders, for instance powders of $MoSi_2$.

If said micromanufactured item 1 should be further processed, it is possible to provide, according to the present invention, for a stretching stage of the micromanufactured item 1. Such stretching stage is preferably carried out simultaneously to or after the forming stage of the micromanufactured item 1, and generally aims at causing a reduction of the transversal size of the micromanufactured item. The stretching of the micromanufactured item 1 can be suitably coordinated with the stages of induction of reticulation and/or of change of inert structure within the starting material, according to current needs.

An object of the present invention is also a micromanufactured item 1, preferably made of ceramic material, which is advantageously produced with a method having one or more of the characteristics described above.

More particularly, said micromanufactured item 1 can be a microtube substantially consisting of a central body 2 (developing along a main axis 2a) made of at least a starting material, which in its permanent and "finished" state (i.e. after the various workings) will be of a ceramic type. Said central body 2 suitably comprises at least an inner cavity 3 (see attached FIGS. 1, 2, 3 and 4).

Thanks to the features of the machines which can be used to carry out the process described above, a plurality of inner cavities 3 can advantageously be present, said cavities developing for given lengths along said main axis 2a and having any diameter distribution (and any arrangement with respect to the cross section of said micromanufactured item 1).

For instance, said plurality of inner cavities 3 can have a pre-determined radial symmetry with respect to at least a cross section of the micromanufactured item 1 (see in particular FIG. 3), or at least an inner cavity 3 can be arranged asymmetrically with respect to a cross section of the micromanufactured item 1 (or in other words, it can have a pre-determined shift from the main axis 2a).

The micromanufactured items 1, or even better the microtubes, produced according to the present invention can also have a main axis 2a which is substantially rectilinear or which comprises a given number of curbed portions. More to the point, the main axis 2a can have a helical development, or the micromanufactured items 1 (and in particular the microtubes) can have a twisted structure.

In any case, the present invention can produce micromanufactured items 1 which can advantageously have a transversal size of the central body 2 between 10 and 15.000 microns, whereas the inner cavities 3 can have a transversal size preferably between 5 and 6.500 microns.

The invention has important advantages.

As a matter of fact, it should first be pointed out that the use of a particular class of polymeric materials (the so-called "pre-ceramic materials") allows to exploit at best the different chemical/physical and rheological properties in the various steps of the process; in other words, the method according to the present invention provides for the use of special materials which at first have the properties typical of plastic materials (and which can therefore be treated with systems suitable to be used for such materials), but then acquire, thanks to specific treatments, the properties of ceramic materials; this allows to greatly simplify the production process, thus producing high-quality micromanufactured items.

It should then be noted that the method according to the present invention, thanks to the particular choice of the raw materials for the various workings, can be applied to a large variety of substances with high-level quality results.

Even more praiseworthy is the fact that the present method is particularly suitable for producing ceramic micromanufactured items, since it advantageously allows to give objects the peculiar molecular structure of a ceramic material after workings which would have been difficult to be carried out on a chemically stabilized ceramic material. In other words, the present invention allows to obtain the shape of the micromanufactured items through easy and fast production steps, and simultaneously allows to define the desired inner structure as easily and fast, both objects not interfering one with the other.

It should also be noted that the present process enables an easy use of simple and tested production methods, which can be advantageously used by means of a suitable scale reduction of extrusion systems. This results in simple working processes together with cost reduction.

Another advantage of the present invention consists in that it is possible to produce micromanufactured items, for instance microtubes or more generally structures endowed with microscopic cavities, with extremely small size, though maintaining an optimal accuracy as far as geometry and surface finishing of the micromanufactured items are concerned.

Furthermore, it should be pointed out that the present invention allows to obtain high production rates thanks to the peculiar arrangement of the execution steps of the process; moreover, it should be noted that such production sequence allows to reduce working times and costs, also in case of micromanufactured items with high technological features.

The invention claimed is:

1. Method for producing ceramic items, comprising the following stages:

preparing a given amount of starting material constituting at least a micromanufactured item (1), said starting material including at least a pre-ceramic polymer;

forming said micromanufactured item (1) with said given amount of starting material;

preparing a given amount of secondary material;

associating the secondary material with the starting material, said stage of associating the secondary material with the starting material being carried out during the stage of forming said micromanufactured item (1) with said given amount of starting material; and dissociating said secondary material from said starting material, said stage of dissociating said secondary material from said starting material being carried out after the stage of forming said micromanufactured item (1) with said given amount of starting material;

characterized in that said stage of associating the secondary material with the starting material is realized by co-extrusion and characterized in that it further comprises a stage of obtaining at least an inner cavity within the micromanufactured item (1) simultaneously to the stage of dissociating the secondary material from the starting material.

2. Method according to claim 1, characterized in that said stage of forming said micromanufactured item (1) with said given amount of starting material is carried out by extrusion and/or pultrusion and/or injection molding.

3. Method according to claim 1, characterized in that said stage of dissociating said secondary material from said starting material is carried out by melting and/or fluidization and/or decomposition of the secondary material and by following removal of the melt and/or fluidized and/or decomposed secondary material from the starting material.

4. Method according to claim 1, characterized in that it further comprises a stage in which the inner structure of the starting material is modified, said inner structure being polymeric at least during the stage of forming said micromanufactured item (1) with said given amount of starting material and being ceramic after the stage of forming said micromanufactured item (1) with said given amount of starting material.

5. Method according to claim 1, characterized in that said stage of forming said micromanufactured item (1) with said given amount of starting material comprises an under-stage in which the starting material is turned into a fluid phase.

6. Method according to claim 1, characterized in that it comprises a stage in which reticulation is induced within the starting material, said reticulation being at least partial or complete and taking place in different moments with respect to said stage of forming said micromanufactured item (1) with said given amount of starting material.

7. Method according to claim 6, characterized in that said stage of dissociating said secondary material from said starting material is simultaneous to or follows at least said stage in which reticulation is induced within the starting material.

8. Method according to claim 6, characterized in that said stage in which reticulation is induced within the starting material is carried out by heating the micromanufactured item (1) and/or by means of chemical reaction with at least a reticulation-promoting substance.

9. Method according to claim 6, characterized in that it comprises a stage of induction of reticulation before said stage of forming said micromanufactured item (1) with said given amount of starting material, a viscosity of the starting material in its fluid phase being varied by means of a partial reticulation of said starting material.

10. Method according to claim 6, characterized in that it comprises a stage of induction of reticulation after said stage of forming said micromanufactured item (1) with said given amount of starting material, at least the starting material being made unmeltable by means of a complete reticulation of said starting material.

11. Method according to claim 6, characterized in that it further comprises a stage of modification of the inner structure of the starting material, said stage of modification of the inner structure of the starting material being carried out with at least a predefined heat treatment and/or by means of chemical reactions with given reagents and/or by means of irradiation of the micromanufactured item (1) with a given radiation.

12. Method according to claim 1, characterized in that said secondary material includes at least a thermoplastic polymer and/or at least a thermosetting polymer and/or glycerols and/or cellulose pulp.

13. Method according to claim 1, characterized in that said secondary material includes at least an elongated element, said elongated element being a fiber with a given length made of polymeric material and/or aramide fibers and/or glass fibers and/or carbon fibers.

14. Method according to claim 1, characterized in that it further comprises a stage in which the starting material and/or the secondary material is added with a given amount of catalysts and/or inert fillers and/or reactive fillers and/or short fibers and/or whiskers and/or nanotubes.

15. Method according to claim 1, characterized in that it further comprises a stage in which the micromanufactured item (1) is stretched, said stretching stage being simultaneous to or following the forming stage of said micromanufactured item (1).

* * * * *